United States Patent [19]

Gaud et al.

[11] Patent Number: 4,671,885

[45] Date of Patent: Jun. 9, 1987

[54] PROCESS FOR THE PREPARATION OF MAGNETIZED HEXAGONAL FERRITES, USE OF THESE FERRITES AS BASE MATERIALS FOR MAGNETS OR FOR MAGNETIC RECORDING

[75] Inventors: Pierre Gaud, Saint-Martin d'Heres; Jean-Claude Joubert, Gieres, both of France

[73] Assignee: Centre National de la Recherche Scientifique, Paris, France

[21] Appl. No.: 807,244

[22] Filed: Dec. 10, 1985

[30] Foreign Application Priority Data

Dec. 11, 1984 [FR] France ................................ 84 19101

[51] Int. Cl.$^4$ ............................................. C04B 35/26
[52] U.S. Cl. ................................ 252/62.59; 252/62.6; 252/62.62; 252/62.63; 252/62.64; 423/594
[58] Field of Search ................. 252/62.59, 62.6, 62.62, 252/62.63, 62.64; 423/594

[56] References Cited

FOREIGN PATENT DOCUMENTS 0102819 3/1984 European Pat. Off. .
145229 6/1985 European Pat. Off. ............ 423/594

OTHER PUBLICATIONS

Hartmut Hibst, "Hexagonal Ferrites from Melts and Aqueous Solutions, Magnetic Recording Materials", Angew, Chem. Int. Ed., Engl. 21, (1982) 270-282.

Primary Examiner—Jack Cooper
Attorney, Agent, or Firm—Sherman and Shalloway

[57] ABSTRACT

Magnetic hexagonal ferrites, in which ferrites the iron atom may be optionally substituted (substituted or unsubstituted barium hexaferrites, etc.), are prepared in high yields, and under non-corrosive conditions by a hydrothermal synthesis reaction between at least one alkali metal ferrite and a compound which releases an alkaline-earth metal ion in water (baryta, etc.) and optionally one or more alkali metal salt(s) of metal oxides. Magnetic hexagonal ferrites can be used as materials for permanent magnets and for ultrahigh frequency components or for magnetic recording materials. For example, ferromagnetic particles having a specific magnetization of at least 65 emu/g and a coercive field strength of at least 2500 oersteds can be prepared.

18 Claims, No Drawings

PROCESS FOR THE PREPARATION OF MAGNETIZED HEXAGONAL FERRITES, USE OF THESE FERRITES AS BASE MATERIALS FOR MAGNETS OR FOR MAGNETIC RECORDING

The present invention relates to a process for the preparation, in a hydrothermal medium, of fine particles of optionally substituted hexagonal ferrites which can be used, in particular, as base materials for permanent magnets or for ultrahigh frequency components, and for magnetic recording. The invention also relates to the hexagonal ferrites produced by the process for their manufacture and to the use of these ferrites in magnetic applications.

Processes for producing magnetized hexagonal ferrites, especially barium hexaferrite, are already known. The preparation of optionally substituted hexaferrites has been described in many patents and articles and especially in the article by H. Hibst published in Angew. Chem. Int. Ed. Engl. 21 (1982) 270–282.

Among the processes which can be employed to obtain hexaferrites there may be mentioned the ceramic process, the coprecipitation and annealing process, the process involving reaction of precursors in molten salts, or hydrothermal synthesis.

The hydrothermal synthesis technique consists in reacting the constituents by dissolution-coprecipitation in an aqueous medium under pressure and at high temperature (150° C. to 400° C.). This reaction was first applied to the synthesis of barium hexaferrite, by the reaction of iron oxide and baryta; thus a dispersion of iron oxide and an aqueous solution of baryta were made to react, which undoubtedly led to the formation of barium hexaferrite, but the results have been unsatisfactory (yield, purity), especially because of the low solubility of iron oxides in water. For this reason, it has been recommended to increase the solubility of the reactants by choosing more suitable precursors and/or by the use of a highly basic medium (addition of alkaline bases). The addition of an alkaline base also makes it possible to increase nucleation by reducing the size of the particles produced and by lowering the reaction temperature.

The iron-based precursors intended to circumvent the difficulty of dissolving iron oxides in water, and which have been recommended within the scope of hydrothermal synthesis, have been ferric or ferrous salts such as chlorides or nitrates, all of which are soluble in water, and freshly prepared α-goethite (FeO.OH).

Thus, European Patent Application No. 102,819 by Toda, describes barium hexaferrites obtained from α-goethite (FeO.OH) by hydrothermal synthesis in a highly basic medium; the plateletshaped magnetic particles can be used for magnetic recording; they have a low specific surface (less than 5m$^2$/g), a magnetization of the order of 35 to 60 emu/g and a coercive field strength of less than 1,000 oersteds.

However, all the processes for the preparation of barium hexaferrite by hydrothermal synthesis as described in the prior art have a number of drawbacks which interfere with their successful scaling-up to an industrial scale.

The use of soluble iron salts (chloride, nitrate, etc.) involves considerable corrosion phenamena which prohibit the industrial use of stainless steel and which require the use of autoclaves with specially resistant linings (for example, the autoclaves need to be gold-lined).

In addition, the purity of hexagonal ferrites is frequenty reduced by the presence of other nonferromagnetic phases which need to be separated, with a consequent limitation in the magnetization and the coercive field strength.

Furthermore, output is low and the yields are far from being quantitative.

The problem which arose, therefore, was to develop a process for the hydrothermal synthesis of hexagonal ferrites and especially optionally substituted barium hexaferrites, a process which made it possible to obtain fine ferromagnetic particles of hexagonal hexaferrites having good magnetic properties, with a high output and in a very high yield, the process being, furthermore, carried out under relatively moderate pressure and temperature conditions and in a relatively noncorrosive medium which did not necessarily require an autoclave lined with a specially resistant material.

The invention is intended to meet precisely these objectives.

There has been found, and this forms the subject of the present invention, a process for the preparation of ferromagnetic hexagonal ferrites of an alkaline-earth metal—in which ferrites the iron atom may be optionally substituted, the hexagonal ferrites being manufactured by hydrothermal synthesis reaction between a compound which releases an alkaline-earth metal ion in water, and at least one iron-based precursor, wherein the precursor used is at least one alkali metal ferrite, optionally associated with alkali metal salts of metal oxides.

Thus, within the scope of the present invention, it is possible to prepare alkaline-earth metal hexaferrites such as barium hexaferrite or hexaferrites in which the iron atom is substituted, such as, for example, barium hexaferrite substituted by metals such as cobalt, titanium, etc.

Preparation of hexaferrites in which the iron atom is unsubstituted

The description will firstly concern the preparation of alkaline-earth metal hexaferrites in which the iron atom is unsubstituted. For the sake of convenience, these will be referred to as unsubstituted hexaferrites. These hexaferrites are manufactured by hydrothermal synthesis using a compound which releases an alkaline-earth metal ion in water (baryta, etc.) and an alkali metal ferrite.

The alkali metal ferrites which can be employed within the scope of the present invention may be compounds which differ in the nature of the alkali metal cation and/or in the nature of the crystalline phase which they form. To illustrate this, there may be mentioned iron ferrites of formula FeNaO$_2$, of alpha and beta varieties, and potassium ferrite FeKO$_2$. Alkali metal ferrites are compounds which are known, per se, but which have never been employed hitherto as precursors in hydrothermal synthesis. Alkali metal ferrites are readily obtained according to known processes, for example, by heating in air, at a high temperature, an inorganic mixture consisting of an iron oxide of fine or coarse particle size and an alkali metal carbonate.

Type β sodium ferrite will advantageously be used as an alkali metal ferrite within the scope of the process. This can be readily obtained by heating a mixture of sodium carbonate and iron oxide (Fe$_2$O$_3$ or Fe$_3$O$_4$) for several hours at about 1000° C.

The nature of the compound which releases an alkaline-earth metal ion in water is not critical, per se; it may be an alkaline-earth metal hydroxide, an organic or inorganic salt or a complex compound of an alkaline-earth metal. Hydroxides, chlorides, acetates and carbonates may be mentioned to illustrate the compounds which release an alkaline-earth metal ion in water.

Barium, strontium, or calcium compounds, and especially barium compounds, will preferably be used within the scope of the present invention as a compound which releases an alkaline-earth metal ion in water. According to an advantageous embodiment, the barium compound is baryta hydrate $Ba(OH)_2.8H_2O$.

According to an alternative embodiment of the present invention, it is also possible to use a mixture of alkali metal ferrites and/or also a mixture of a compound which releases at least two alkaline-earth metal ions of different kinds in water. Naturally, the use of a mixture of alkali metal ferrites and a mixture of compounds releasing at least two alkaline-earth metal ions in water is to be considered as an alternative embodiment of the present invention.

Preparation of hexaferrites in which the iron atom is substituted

The trivalent iron atom in the hexaferrites may be completely or partially substituted, within the scope of the process of the present invention, by one or more other metal atoms.

The possibilities of substitution correspond to those which are already described in the literature and especially to those described by H. Hibst, in the article referred to above.

The substitution of trivalent iron will preferably be partial and bimetallic: it will be advantageously produced by one of the following three metal pairs:

Ti+a divalent metal,
Sn+a divalent metal,
Zr+a divalent metal.

The divalent metal used will advantageously be chosen from copper, nickel, cobalt, magnesium, zinc and divalent iron.

According to another advantageous alternative embodiment of the present invention, at most two iron atoms will be substituted in the hexaferrite molecule; this substitution will preferably be produced by means of the titanium-cobalt metal pair, in various proportions, equimolar or not.

Also, the substitution, as defined and envisaged within the scope of the invention, will be understood to extend to the hexaferrites in which the iron atom is substituted and in which the hexaferrite structure contains at least two alkaline-earth metal atoms.

To produce the substitutions defined above, it suffices to add, within the scope of the process of the invention, one or more alkali metal salt(s) of one or more metal oxide(s) to the reaction mixture consisting of the alkali metal ferrite and the compound which releases the alkaline-earth metal ion in water; the alkali metal salts of metal oxides will be chosen as a function of the required hexaferrite structures and in suitable proportions; the alkali metal salts of metal oxides may include one or more non-alkali metal atoms. In this context, and by way of illustration, the following alkali metal salts of single or double metal oxides may be mentioned: $TiNa_2O_3$, $SnNa_2O_3$, $ZrNa_2O_3$, $CoNaO_2$, $TiCoNa_2O_4$, the corresponding potassium salts, lithium salts, etc.

The conditions used to carry out the hydrothermal synthesis reaction within the scope of the process of the invention will now be described; these conditions for producing hexaferrites are substantially the same whether the trivalent iron atom is substituted or not. In general, the hydrothermal synthesis reaction is carried out at a temperature above 100° C. and below the critical point of the aqueous mixture; the temperature is usually between 200° and 400° C.; as will be explained later, the choice of the temperature has a major effect on the size, crystallinity and magnetic properties of the hexaferrite; pressure can vary depending on the working conditions and especially on the extent to which the autoclave is filled. The pressure is generally below 500 bars and usually between 30 and 300 bars.

The relative proportion of the various reactants may vary widely. As a general rule the compound which releases the alkaline-earth metal ion in water is used in excess. In the case of barium, the atomic ratio barium/iron (or substituted iron where appropriate) is usually between 1/6 and 1/12 (1/12 stoichiometric ratio) and is preferably between 1/8 and 1/10.

The hydrothermal process is generally carried out without an initial addition of an alkaline base to the main reactants.

According to an alternative embodiment of the present invention, it is possible to add an alkaline base initially to the main reactants. The quantity of alkaline base which is added depends on the quality of the water used (in order to control the pH) and is then such that there are initially from 0.5 to 20 moles of alkaline base per mole of alkali metal ferrite, the quantity of water which is added being less than or equal to 100 cm$^3$. The added base is advantageously sodium hydroxide. This addition of an alkaline base, together with decreasing the temperature value, makes it possible to increase the nucleation phenomena and thereby to reduce the particle size.

The value of the autoclave filling coefficient may vary widely; advantageously, the filling coefficient will be very high, to increase output; the amount of water employed may be relatively small; on a weight basis, the mixture of the alkali metal ferrite powder+the compound which releases the alkaline-earth metal ion in water may thus represent 100 to 300% of the weight of the water used.

It can be seen, therefore, that, in contrast to previously known processes, the quantity of product produced is very large for a given autoclave volume, since the quantity of water employed can be very small.

The hydrothermal synthesis process is carried out for periods which can vary, of course, as a function of the temperature, pressure, and the nature and proportion of the reactants. Reaction times are usually between 1 hour and several hours.

When the reaction is complete or when it is decided it should be stopped, the reaction mixture is brought back to normal temperature, preferably by cooling the autoclave rapidly.

The hexagonal hexaferrite produced is purified by the use of conventional methods by removing residual reactants and the nonferromagnetic phases which are formed; in particular, a separation process based on the differences in magnetic properties may be used.

According to a preferred treatment process of the present invention, the hexaferrites are washed with dilute aqueous solutions of an acid such as hydrochloric acid, or nitric acid, which generally make it possible to obtain an effective removal of the nonferromagnetic phases from the present system; acid dilution is not critical: it is usually between 5 and 50%. A 20% dilution is suitable.

According to another preferred treatment process of the present invention, it is also possible to carry out an annealing operation on the hexaferrite produced by hydrothermal synthesis. This annealing is usually carried out in air for one or several hours at a temperature between 700° and 1200° C.; this temperature is advantageously in the region of 1000° C.

Lastly, according to another treatment process for purifying the hexaferrites, an acid wash and an annealing operation may be combined, in variable order. When judiciously chosen, this combined treatment generally makes it possible to optimize the magnetic properties.

As already stated, the process according to the invention makes it possible to manufacture hexagonal hexaferrites with variable magnetic properties by virtue of the possibilities of substitution of the trivalent iron present in their molecule, and which can be used either in permanent magnets or for ultrahigh frequency components or as magnetic recording carriers.

It is known that the magnetic properties which are required differ according to whether the particles in question are intended for permanent magnets or as recording carriers.

The process according to the invention enables ferromagnetic particles for permanent magnets to be obtained; these substances, which generally are unsubstituted, are characterized by a high magnetization value and by a coercive field strength of at least 1200 oersteds. To obtain the formation of such particles, the hydrothermal synthesis reaction is carried out at a relatively moderate temperature (225° to 300° C.); the hexaferrites produced are then preferably subjected to an annealing treatment which usually enables the magnetization value and the coercivity value to be increased. The particles produced have a specific magnetization of at least 65 emu/g and a coercive field strength of at least 2500. It is obvious that the values just mentioned should not be considered to be any kind of limitation.

The process according to the invention also makes it possible to obtain particles of substituted or unsubstituted hexagonal hexaferrites which can be used as carriers for magnetic recording. To attain this result, the hydrothermal synthesis reaction is carried out at a relatively high temperature, of the order of 300° C. or higher. After a purification treatment the particles have a specific magnetization of at least 65 emu/g and a coercive field strength value of less than 1200 oersteds.

The hexagonal ferrites manufactured according to the process of the present invention have various uses, such as magnetic materials for permanent magnets or for magnetic recording materials, e.g. sound recording tapes, video recording tapes, information tapes or strips for credit cards, security control cards, etc.

The following examples illustrate the invention.

EXAMPLE 1

39.40 g of baryta octahydrate $Ba(OH)_2.8H_2O$ are introduced into an autoclave together with 110.60 g of the $\beta$ sodium ferrite $NaFeO_2$ and 90 cm$^3$ of water; the reaction mixture, in which the atomic ratio barium/iron is equal to 1/8, is heated to 395° C. for 4 hours; the pressure reaches 200 bars. After cooling by quenching, the reaction mass, which is in particulate form, is first washed with a 20% strength aqueous solution of nitric acid and then with pure water, and is finally annealed in air for 2 hours at 1000° C.

X-ray diffraction shows the presence of a well crystallized M phase typical of barium hexaferrite $BaFe_{12}O_{19}$. The hexaferrite has been produced in a 90% yield and with a purity of 95%.

The magnetic properties are as follows:
specific magnetization: 66.2 emu/g (66.6 Am$^2$/hg)
coercive field strength: 1250 oersteds.

The magnetization measurements were carried out while the maximum field was 2.66 tesla.

The particles have a specific surface area of 2.7 m$^2$/g.

EXAMPLE 2

The hydrothermal synthesis is carried out according to the process described in Example 1 but at a temperature of 250° C., for 4 hours 30 minutes (maximum pressure reached: 40 bars).

After quenching and purification as in Example 1, followed by washing and annealing, barium hexaferrite crystals are obtained with a coercive field strength of 3600 oersteds.

The magnetization is 54.5 emu/g.
The specific surface area is 5.3 cm$^2$/g.

When the annealing is carried out first and is followed by a washing, the properties are:
specific magnetization: 65 emu/g
coercive field strength: 2660 oersteds
specific surface area: 2.5 cm$^2$/g.

EXAMPLE 3

The hydrothermal synthesis is carried out by using the process described in Example 1 but at a temperature of 345° C., for 6 hours (maximum pressure reached: 130 bars), while the volume of water added initially is 60 cm$^3$.

After quenching and purification as in Example 1, barium hexaferrite crystals are obtained with the following magnetic properties:
specific magnetization: 64.2 emu/g
coercive field strength: 1460 oersteds
specific surface area: 3.7 m$^2$/g.

EXAMPLE 4

By following the procedure of Example 1 the hydrothermal synthesis reaction is carried out at 400° C. for 6 hours, with the initial use of 90 cm$^3$ of water and 150 g of the barytaferrite powder mixture.

In Experiment 4a, the atomic ratio barium/iron was 1/6; in Experiment 4b, the atomic ratio was 1/10.

After quenching and purification as in Example 1, barium hexaferrite crystals are obtained with the following properties:

EXAMPLE 4a specific magnetization: 67.6 emu/g
coercive field strength: 1250 oersteds.

EXAMPLE 4b specific magnetization: 66.4 emu/g
coercive field strength: 1350 oersteds.

EXAMPLE 5

39.425 g of baryta octahydrate $Ba(OH)_2.8H_2O$, 101.61 g of $\beta$ sodium ferrite $NaFeO_2$, 9.00 g of the compound of formula $TiCoNa_2O_4$, and 90 cm$^3$ of water are introduced into an autoclave; the reaction mixture is heated to 300° C. for 4 hours.

After being cooled by quenching, the reaction mass, which is in particulate form, is washed with pure water, annealed in air for 2 hours at 1000° C., washed with a 20% strength aqueous solution of nitric acid and, lastly, washed with pure water.

X-ray diffraction and chemical analysis show that the compound formed in a yield of the order of 90% corresponds to the hexaferrite of the following formula:

$$BaFe_{11}Ti_{0.5}Co_{0.5}O_{19}.$$

The magnetic properties are as follows:
specific magnetization: 60 emu/g
coercive field strength: 1200 oersteds.

What is claimed is:

1. A process for producing ferromagnetic hexagonal alkaline-earth metal hexaferrite which comprises reacting under a pressure below 500 bars, in an autoclave, under hydrothermal synthesis reaction conditions at a temperature above 100° C., a compound which will release an alkaline earth metal ion in water, and at least one alkali metal ferrite.

2. The process according to claim 1, in which the alkali metal ferrite is $\beta$-species sodium ferrite.

3. The process according to claim 1 or claim 2, in which the compound which releases the alkaline-earth metal ion in water is a hydroxide, an organic salt or an inorganic salt.

4. The process according to claim 1 or claim 2, in which the compound which releases the alkaline-earth metal ion in water is a barium or strontium compound.

5. The process according to claim 1 or claim 2, in which the compound which releases the alkaline-earth metal ion in water is baryta.

6. The process for the preparation of hexagonal ferrite according to claim 1 or claim 2, which further comprises purifying the hexaferrites by acid washing.

7. The process of claim 1 or claim 2 which further comprises annealing the hexaferrite in air at a temperature of from about 700° C. to about 1200° C.

8. The process of claim 7 wherein the hydrothermal synthesis reaction is carried out at a temperature in the range of from about 225° C. to about 300° C. whereby the annealed hexagonal ferrite has a coercive field strength of at least 1200 oersteds.

9. The process of claim 1 wherein the hydrothermal synthesis reaction is carried out at a temperature of 300° C. or higher whereby the hexagonal ferrite has a coercive field strength of less than 1200 oersteds.

10. The process according to claim 1 for the preparation of hexaferrites in which the iron atoms in the hexaferrite are partially substituted by at least another metal, the process further comprising adding at least one alkali metal salt of a metal oxide to the reaction mixture of the alkali metal ferrite and the compound which releases the alkaline-earth metal ion in water whereby said iron atoms are partially substituted by the metal of said metal oxide.

11. The process according to claim 10, in which the at least one alkali metal salt of a metal oxide is a salt of a single or double metal oxide, whereby the substitution in the hexaferrite is bimetallic and is selected from the group consisting of
   Ti + a divalent metal,
   Sn + a divalent metal, and
   Zr + a divalent metal, the divalent metal being copper, nickel, cobalt, magnesium, zinc, or divalent iron.

12. The process according to claim 10, in which the substitution in the hexaferrite corresponds to the metal pair titanium-cobalt.

13. The process of claim 1, wherein the compound which will release an alkaline-earth metal ion in water and the at least one alkali metal ferrite are reacted in water, the amount of said reactants being from about 100 to about 300% of the weight of water.

14. The process of claim 1 wherein the reaction is carried out in an aqueous medium in the presence of an alkaline base.

15. The process of claim 14 wherein the alkaline base is present in an amount of from about 0.5 to about 20 moles per mole of alkali metal ferrite.

16. The process of claim 15 wherein the alkaline base comprises sodium hydroxide.

17. The process of claim 1 wherein the alkaline earth metal ion is barium and the amount of said compound is such that the atomic ratio of barium to iron is from about 1:6 to 1:12.

18. The process of claim 17 wherein the atom ratio of barium to iron is from about 1:8 to 1:10.

* * * * *